US011195323B2

(12) United States Patent
Oriol et al.

(10) Patent No.: US 11,195,323 B2
(45) Date of Patent: Dec. 7, 2021

(54) MANAGING MULTI-MODAL RENDERING OF APPLICATION CONTENT

(71) Applicant: Apple Inc., Cupertino, CA (US)

(72) Inventors: Timothy R. Oriol, San Jose, CA (US); Peter L. Hajas, San Jose, CA (US); Daniel T. Kurtz, San Jose, CA (US); Edwin Iskandar, San Jose, CA (US); Charles Magahern, San Francisco, CA (US); Jeremy G. Bridon, San Jose, CA (US); Naveen K. Vemuri, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/010,762

(22) Filed: Sep. 2, 2020

(65) Prior Publication Data
US 2021/0065436 A1 Mar. 4, 2021

Related U.S. Application Data

(60) Provisional application No. 62/895,427, filed on Sep. 3, 2019.

(51) Int. Cl.
| | |
|---|---|
| *G06T 15/20* | (2011.01) |
| *G06T 11/60* | (2006.01) |
| *G06T 17/00* | (2006.01) |
| *G06T 5/00* | (2006.01) |
| *H04N 13/261* | (2018.01) |

(52) U.S. Cl.
CPC ............ *G06T 15/205* (2013.01); *G06T 5/002* (2013.01); *G06T 5/006* (2013.01); *G06T 11/60* (2013.01); *G06T 17/005* (2013.01); *H04N 13/261* (2018.05); *G06T 2200/24* (2013.01)

(58) Field of Classification Search
CPC ...... G06T 15/205; G06T 5/002; G06T 19/006
See application file for complete search history.

(56) References Cited

U.S. PATENT DOCUMENTS

| | | | |
|---|---|---|---|
| 2004/0100489 A1* | 5/2004 | Berestov | H04N 13/334 715/738 |
| 2017/0277666 A1* | 9/2017 | Andriotis | G06T 15/20 |

OTHER PUBLICATIONS

International Search Report and Written Opinion from PCT/US2020/049246, dated Nov. 2, 2020, 12 pages.

* cited by examiner

*Primary Examiner* — Shivang I Patel
(74) *Attorney, Agent, or Firm* — Morgan, Lewis & Bockius LLP (57) ABSTRACT

A device implementing a system for managing multi-modal rendering of application content includes at least one processor configured to receive content, provided by an application running on a device, for displaying in a three-dimensional display mode. The at least one processor is further configured to determine that the content corresponds to two-dimensional content. The at least one processor is further configured to identify a portion of the two-dimensional content for enhancement by a three-dimensional render. The at least one processor is further configured to enhance, in response to the determining, the portion of the two-dimensional content by the three-dimensional renderer. The at least one processor is further configured to provide for display of the enhanced portion of the two-dimensional content on a display of the device in the three-dimensional display mode.

20 Claims, 5 Drawing Sheets

MANAGING MULTI-MODAL RENDERING OF APPLICATION CONTENT

CROSS REFERENCE TO RELATED APPLICATIONS

This application claims the benefit of priority to U.S. Provisional Patent Application No. 62/895,427, entitled "Managing Multi-Modal Display of Application Content," filed on Sep. 3, 2019, the disclosure of which is hereby incorporated herein in its entirety.

TECHNICAL FIELD

The present description relates generally to managing multi-modal rendering of application content, including managing the rendering and display of application content on a computing device.

BACKGROUND

Applications developed for electronic devices such as phones, tablets, computing devices and the like, are typically developed and compiled for two-dimensional display on the electronic devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A computer-generated reality (CGR) system enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein enable applications developed to display content in a two-dimensional display mode (e.g., on a mobile device, tablet, or computer) to be used (with or without recompiling) on devices that utilize a three-dimensional display mode, such as a CGR mode provided by a mobile device, a tablet device, and/or a head-mounted system. For example, three-dimensional effects/features may be added to at least a portion of the two-dimensional content for an enhanced display in the three-dimensional display mode. In this regard, a device may utilize a two-dimensional renderer/or and a three-dimensional renderer that may coordinate with one another for identifying portions of the two-dimensional content that can be enhanced for display in the three-dimensional display mode. In some implementations, a portion of the two-dimensional content may be identified for enhancement and rendering by the three-dimensional renderer while another portion of the two-dimensional content may be rendered by the two-dimensional renderer.

In this manner, the subject system allows for binary and/or source code compatibility of applications developed for display in a two-dimensional display mode (such as applications developed for use on a phone, tablet or computer), with respect to devices that support a three-dimensional display mode, such as a mobile device, a tablet device, and/or a head-mounted system. Furthermore, the subject system provides for automatically enhancing at least a portion of the two-dimensional content to include three-dimensional features for display in the three-dimensional display mode in a perspective correct manner.

Figure 1:
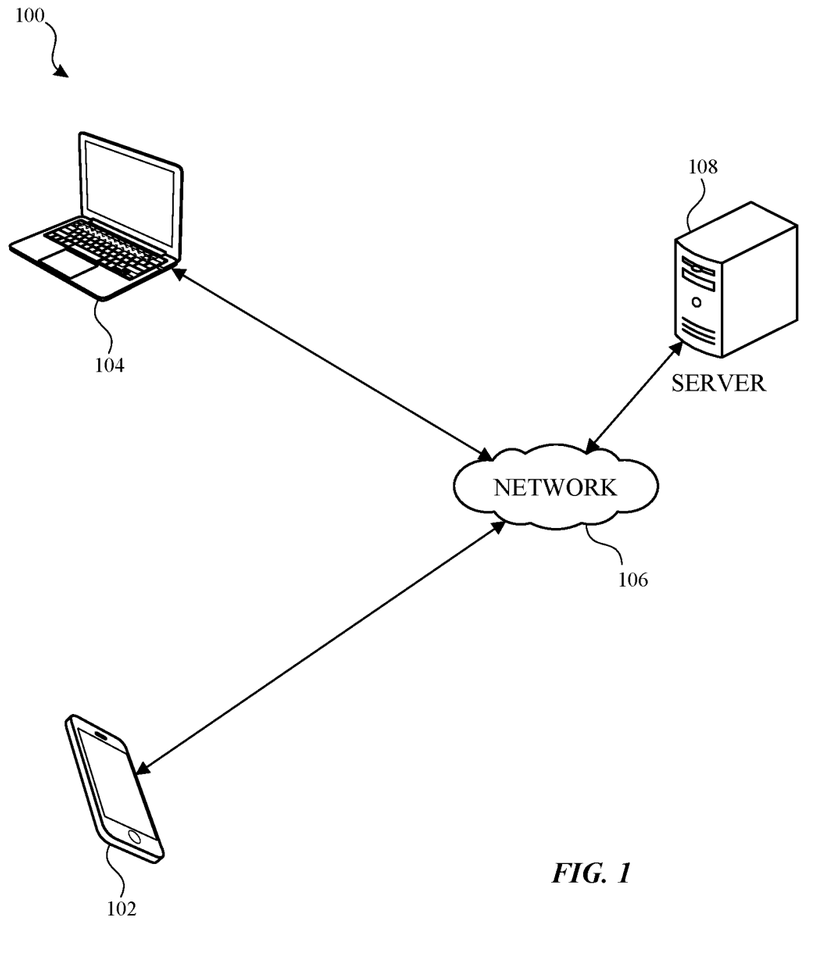
FIG. 1 illustrates an example network environment that provides for managing multi-modal rendering of application content in accordance with one or more implementations.

FIG. 1 illustrates an example network environment 100 that provides for managing multi-modal rendering of application content in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104 (hereinafter 102-104), a network 106 and a server 108. The network 106 may communicatively (directly or indirectly) couple, for example, any two or more of the electronic devices 102-104 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be implemented, for example, as a mobile device, a tablet device, a computing device, or as a head mounted portable system (e.g., worn by a user). One or more of the electronic devices 102-104 may include a display system capable of presenting a visualization of a computer-generated reality environment to the user. In an example, the display system of one or more of the electronic devices 102-104 may provide a stereoscopic presentation of the computer-generated reality environment, enabling a three-dimensional visual display of a rendering of a particular scene, to the user, which may be adjusted based on the movement of the user and/or the orientation/direction of the user's body and/or head. In FIG. 1, by way of example, the electronic device 102 is depicted as a handheld mobile device, and the electronic device 104 is depicted as a laptop computer. Each of the electronic devices 102-104 may be, and/or may include all or part of, the device discussed below with respect to FIG. 2, and/or the electronic system discussed below with respect to FIG. 5.

The server 108 may be and/or may include all or part of the electronic system discussed below with respect to FIG. 5. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers.

The electronic devices 102-104 may provide for managing multi-modal rendering of application content as described herein. The application content may correspond to locally-stored content, content provided by the server 108 via the network 106, or a combination of both. In one or more implementations, one or more of the electronic devices 102-104 may include both a two-dimensional renderer for rendering two-dimensional content and a three-dimensional renderer for rendering three-dimensional content and for enhancing and rendering at least a portion of the two-dimensional content.

For example, some applications running on the electronic devices 102-104 may have been developed for display of three-dimensional content, such as by a device that supports a three-dimensional display mode, such as a mobile device, a tablet device, and/or a head-mounted system, whereas other applications running on the electronic devices 102-104 may have been developed for display of two-dimensional content, such as on a device that supports only a two-dimensional display mode, such as a mobile device, a tablet, a computer, and the like. For the applications that were developed for the devices that support only a two-dimensional display mode, the subject system may enhance the two-dimensional content (e.g., with or without recompiling the application) by rendering at least a portion of the two-dimensional content by the three-dimensional renderer, as is discussed further below with respect to FIGS. 3 and 4.

For explanatory purposes, the subject system is described herein with reference to multi-modal rendering of content, such as rendering content by a two-dimensional renderer and/or a three-dimensional renderer. However, the subject system may also be applicable to other modes of presenting content, such as audio-only output of content, e.g., in a two-dimensional mode on a smart speaker and/or in a three-dimensional mode on a mobile device, a tablet device, and/or a head-mounted system worn by a user, and/or accessible output of content, e.g., in a vision and/or hearing accessibility mode.

Figure 2:
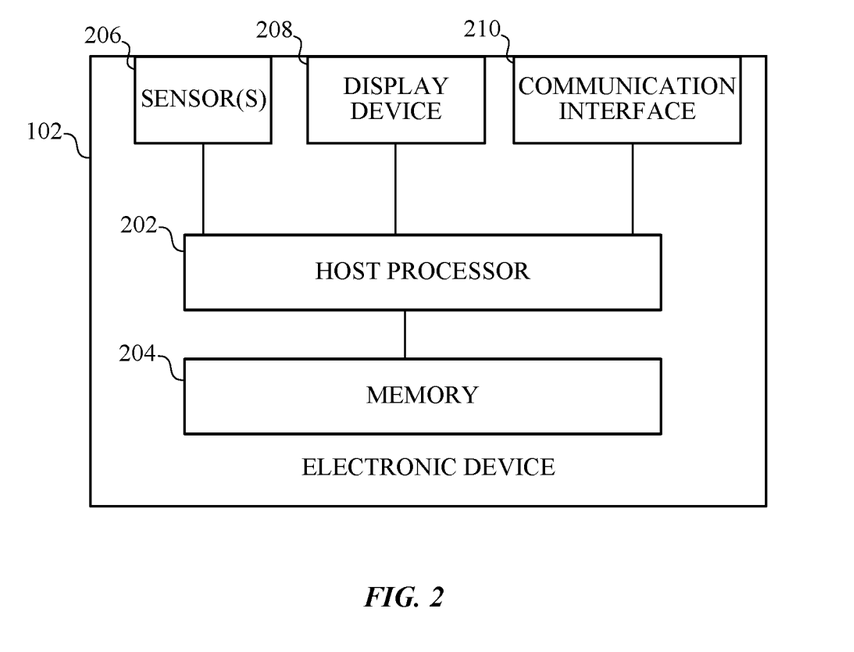
FIG. 2 illustrates an example device that may implement a system for managing multi-modal rendering of application content in accordance with one or more implementations.

FIG. 2 illustrates an example device that may implement a system for managing multi-modal rendering of application content in accordance with one or more implementations. For explanatory purposes, FIG. 2 is primarily described herein with reference to the electronic device 102 of FIG. 1. However, FIG. 2 can correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, one or more sensor(s) 206, a display device 208, and a communication interface 210. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

In one or more implementations, the processor 202 may represent a system-on-a-chip (SOC) that may include one or more central processing units (CPUs), one or more graphics processor unit (GPUs), and/or one or more neural processors, as well as one or more other processors, and/or the processor 202 may represent multiple discrete processors, such as one or more CPUs, one or more GPUs, one or more neural processors, one or more always-on processors, and the like.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store code for displaying content, for example, as discussed below with respect to the architecture of FIG. 3. The memory 204 may store application(s) configured to display application content (e.g., two-dimensional content and/or three-dimensional content). The application content for display may be processed, scaled, modified, and/or provided to display circuitry for display on the display device 208.

The display device 208 may correspond to an output device for presentation of information in visual and/or tactile form. The display device 208 may be, for example, a liquid crystal display (LCD), a light emitting diode (LED) display, an organic light emitting diode (OLED) display, a flexible display, a head mounted display, a flat panel display, a solid state display and/or a projector. Moreover, the display device 208 may include function as both an input and output device, such as a touchscreen. For example, feedback provided to the user on the display device 208 may be in sensory feedback (e.g., visual feedback, tactile feedback and/or auditory feedback), and input from the user can be received in any form (e.g., acoustic, speech and/or tactile input). In one or more implementations, the same display device (e.g., the display device 208) may be used in two-dimensional and/or three-dimensional modes. For example, the three-dimensional mode may involve stereoscopic display of content on the display device 208.

The sensor(s) 206 may include one or more motion sensor(s), such as an accelerometer and/or a gyroscope (e.g., a rate gyroscope). The motion sensor(s) may be used to facilitate movement and orientation related functions of the electronic device 102, for example, to detect the position of the body and/or head of a user holding and/or wearing the electronic device 102. Alternatively or in addition, the sensor(s) 206 may include one or more light sensor(s), such an as image sensor and/or an ambient light sensor. The image sensor(s) may be used to capture a pass-through video stream with respect to the current environment of the user of the electronic device 102. Moreover, the sensor(s) 206 may include a proximity sensor configured to detect when the electronic device 102 is near an object (e.g., suggesting that the electronic device is in proximity with a head of the user). The sensor(s) 206 may further include depth sensors (e.g., time-of-flight sensors, infrared sensors, radar, sonar, lidar, etc.), one or more microphones, and/or other types of sensors for sensing the physical environment.

The communication interface 210 may include suitable logic, circuitry, and/or code that enables wired or wireless communication, such as between any of the electronic devices 102-104 and the server 108 over the network 106. The communication interface 210 may include, for example, one or more of a Bluetooth communication interface, a cellular interface, an NFC interface, a Zigbee communication interface, a WLAN communication interface, a USB communication interface, or generally any communication interface.

Figure 3:
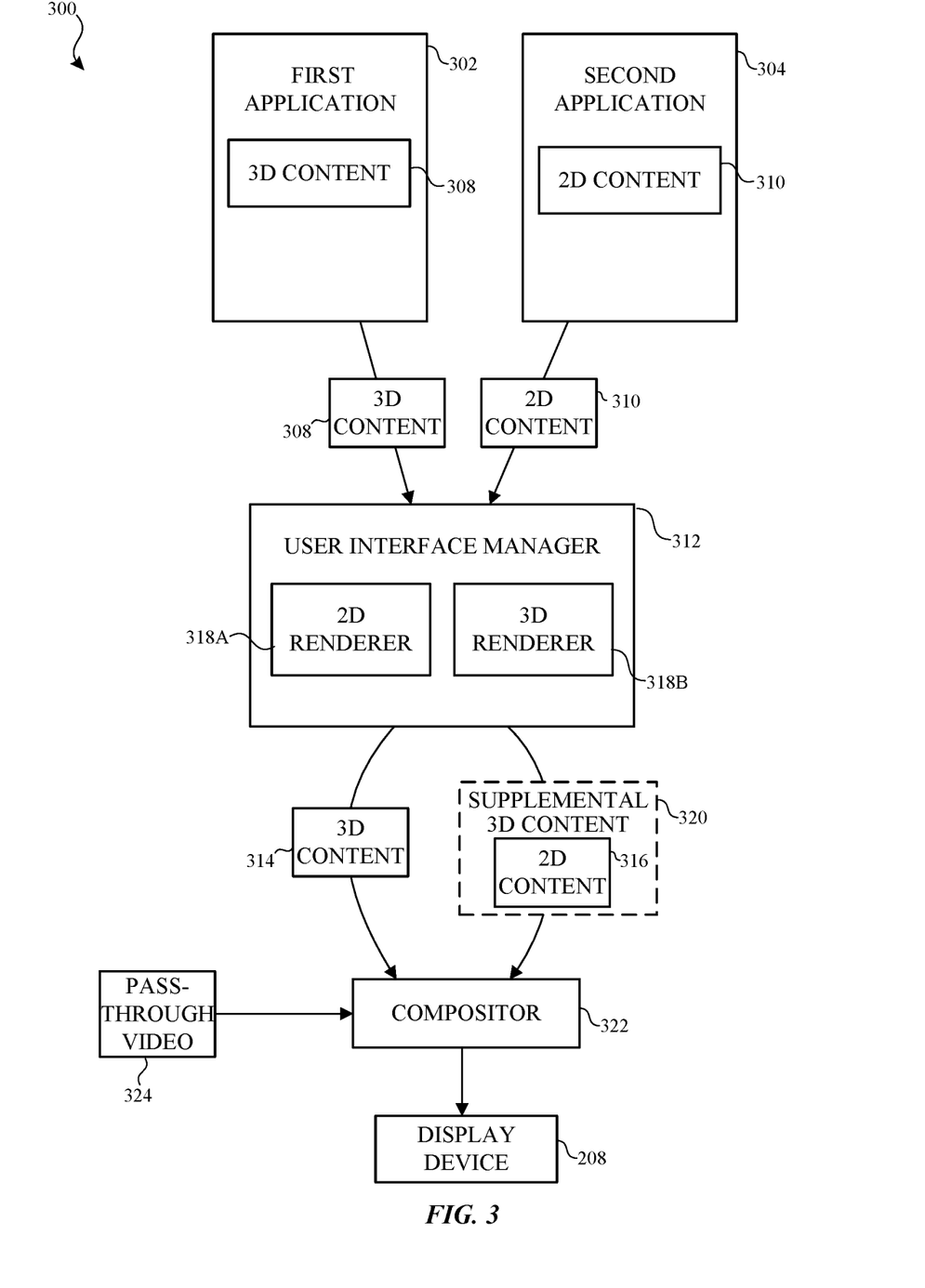
FIG. 3 illustrates an example architecture for multi-model rendering of application content in accordance with one or more implementations.

FIG. 3 illustrates an example architecture 300 for multi-modal rendering of application content in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 may include a first application 302 (developed to provide three-dimensional content 308), a second application 304 (developed to provide two-dimensional content 310), and a user interface manager 312 (that includes and/or is communicatively coupled to a two-dimensional renderer 318A and/or a three-dimensional renderer 318B). The architecture 300 may further include a compositor 322 that may composite a pass-through video stream 324 (e.g., from one or more image sensors) with three-dimensional content 314 and/or two-dimensional content 316 with supplemental three-dimensional content 320 corresponding to the applications 302, 304. The compositor 322 may provide the composited content to the display device 208 for display to a user. In one or more implementations, the architecture 300 may not include the compositor 322 and/or the pass-through video stream 324. In one or more implementations, the architecture may not include the two-dimensional renderer 318A and/or the two-dimensional renderer 318A may be integrated into the three-dimensional renderer 318B (or vice-versa).

The first and second applications 302-304 may represent applications that are native to an operating system of the electronic device 102, such as the applications that come pre-installed on the operating system. Alternatively or in addition, the applications 302-304 may represent third-party applications that are installed, for example, via an application store accessible through the operating system of the electronic device 102.

In the example of FIG. 3, the first application 302 corresponds to an application that is configured to generate/provide three-dimensional content for display in a three-dimensional display mode, such as in a CGR environment. For example, in developing the first application 302, a developer may have developed the application to display three-dimensional content 308 in a three-dimensional display mode, such as on a mobile device, a tablet device, and/or a head-mounted system worn by a user. On the other hand, the second application 304 corresponds to an application is configured to generate/provide two-dimensional content for display in a two-dimensional display mode, such as on a mobile device or tablet device. For example, the second application 304 may correspond to a legacy application that was developed for displaying two-dimensional content for a two-dimensional display mode, such as on a mobile device, tablet or computer, but not for a three-dimensional display mode. In one or more implementations, a third application (not shown) may be an application developed for displaying content in a two-dimensional display mode, e.g., on a mobile device, tablet device, and/or a computing device, as well as for displaying content in a three-dimensional display mode, such as on a mobile device, a tablet device, and/or a head-mounted system worn by a user.

In one or more implementations, the applications 302-304 may be configured to provide the three-dimensional content 308 and/or the two-dimensional content 310 to the user interface manager 312 in a declarative format. For example, the applications 302-304 may provide a hierarchy of layers, a tree or graph structure (e.g., a view tree, layer tree, and/or a scene graph), and/or any other declarative form of describing the content, rather than provide the entirety of the rendered content itself. In this manner, the user interface manager 312 can collectively manage, render, and display the content 308-310 with the appropriate attributes, parameters, and the like, such as based on the current environment of the user in the three-dimensional display mode.

In this regard, the user interface manager 312 may be, and/or may include, one or more operating system-level processes that manage a user interface displayed to the user.

The user interface manager 312 may include and/or may be communicatively coupled to, a two-dimensional renderer 318A for rendering two-dimensional content, and a three-dimensional renderer 318B for rendering three-dimensional content. For example, the user interface manager 312 may receive the legacy two-dimensional content 310 from the second application 304 in a declarative format, such as a tree that describes one or more user interface elements being displayed by the second application 304. The tree may include and/or may be associated with a hierarchy of layers that describes each layer that the second application 304 would like to be displayed. For example, the second application 304 may wish to display content in conjunction with a backdrop, which may utilize one or more blur layers and/or other filter layers. Thus, the tree may include a node and/or subtree that contains one or more attributes describing the blur layer, such as depth, size, placement, and the like.

Thus, the user interface manager 312 may receive the tree describing the two-dimensional content 310 in a declarative format from the second application 304, and may parse the tree to manage the rendering of the content between the two-dimensional renderer 318A and the three-dimensional renderer 318B. In one or more implementations, the user interface manager 312 may pass the tree to one of the renderers 318A-B, such as the three-dimensional renderer 318B, for managing the rendering of the content.

In this regard, the three-dimensional renderer 318B may parse the tree, determine which of the two-dimensional content 310 can be rendered and/or supplemented with supplemental three-dimensional content 320, and may render the supplemental three-dimensional content 320 accordingly. For example, the three-dimensional renderer 318B may determine whether two-dimensional user interface elements indicated in the two-dimensional content 310 in the declarative format can be replaced and/or supplemented with counterpart three-dimensional user interface elements. Such user interface elements may include, for example, wheels/pickers (e.g., date wheels), menus, page controls, buttons, labels, progress indicators, sliders, steppers, switches, text fields, collections, or generally any two-dimensional user interface element that can be represented in a three-dimensional form.

If the three-dimensional renderer 318B identifies two-dimensional user interface elements that be rendered and/or supplemented with three-dimensional content (such as two-dimensional user interface elements for which a corresponding three-dimensional user interface element exists), the three-dimensional renderer 318B makes the appropriate library call to obtain and render the content in a three-dimensional form. In one or more implementations, the three-dimensional renderer may use and/or translate one or more parameters and/or attributes that declaratively describe the two-dimensional content for use in rendering the two-dimensional content in the three-dimensional form. For example, the three-dimensional renderer may translate size and/or position information from a two-dimensional coordinate system to a three-dimensional coordinate system. This may be particularly relevant, for example, when rendering layers of a layer tree that may be associated with depth information that can be translated to a z-coordinate (and/or z-plane) in a three-dimensional coordinate system.

Since the two-dimensional content 310 is provided to the user interface manager 312 in a declarative format, the three-dimensional renderer 318B can render the two-dimensional content in a three-dimensional form even though the second application 304 was developed for displaying content in a two-dimensional display mode (e.g., on a mobile device, tablet, computing device, and the like). Thus, the developer of the application receives the benefit of the content being displayed in a three-dimensional display mode, such as via a mobile device, a tablet device, and/or a head-mounted system, even though the second application 304 was not developed for such a display mode.

In the instance that the developer of the second application 304 developed the second application 304 for display in a two-dimensional display mode (e.g., on a mobile device, tablet device, etc.), but with the expectation that the second application 304 may be displayed in a three-dimensional display mode, the developer may have included indicators and/or flags in the tree that may identify whether a particular node or subtree should be enhanced and/or rendered using the three-dimensional renderer 318B or rendered using the two-dimensional renderer 318A.

In one or more implementations, the developer may include a first set of attributes that are utilized for rendering the user interface element by the two-dimensional renderer 318A (such as on a device (not shown) that only supports a two-dimensional display mode) and a second set of attributes that are utilized for rendering the user interface by the three-dimensional renderer 318B. The sets of attributes may overlap or may be discrete. For example, a node or subtree of the tree may include an attribute or indicator indicating a requested depth for a user interface element in a two-dimensional display mode and the node or subtree may also include an attribute or indicator indicating a z-coordinate or z-plane for the user interface element in the three-dimensional display mode.

In one or more implementations, the three-dimensional renderer 318B may determine that two-dimensional text content can be converted (the user interface manager 312 may be unable to draw the flat text as a three-dimensional texture) and rendered in a three-dimensional form, such as to display perspective correct text. Perspective correct text may be three-dimensional text that appears to be in the correct perspective for the user of the electronic device 102. Thus, information from the one or more sensor(s) 206 may be used to provide the three-dimensional renderer 318B with information regarding the position, orientation, etc. of the body and/or head of the user. In this manner, the three-dimensional renderer 318B can render the three-dimensional text in a manner that is perspective correct with respect to the user of the electronic device 102. If the user of the electronic device 102 is interacting with another user in a CGR environment, the other user's electronic device can similarly render the same text in a manner that is perspective correct with respect to the view of the other user.

For example, the two-dimensional text may be serialized into a format that can be processed directly by the GPU for converting the two-dimensional text into a vector graphics form that may be displayed as three-dimensional perspective correct text. The serialized text may be provided to the GPU and the GPU can process and/or post-process the text (e.g., shaders, anti-aliasing, etc.) and return the text in the vector graphics form. In one more implementations, the text may be tessellated with polygons to convert the text into a vector graphics form In one or more implementations, a scan-line conversion of the text may be performed by the CPU where for each row, from left-to-right, all intersections of a path are found and a non-zero rule defines when to fill lines in the path. For example, the geometry corresponding to the text may be split into tiles of relevant quadratic curves and a texture of all filled tiles may be generated. For each tile, a list of all contributing paths (of the quadratic curves) for the tile may be generated, and then a texture of all filled tiles may be generated. For example, all fully-covered tiles may be written to texture. For tiles that are not fully covered, their edges can be looked-up and a local scan-conversion may be performed. Such a technique may be performed quickly because the fast texture path is used for the filled tiles and the edge tiles are isolated to just the contributing edges. The edge selection may only select edges contributing to the visible tile while also respecting the paths that cover other paths.

Referring back to the two-dimensional content 310, if the three-dimensional renderer 318B identifies one or more user interface elements corresponding to a node or subtree should be rendered by the two-dimensional renderer 318A (e.g., because there is no appropriate counterpart three-dimensional user interface element, or because the subtree or node includes an attribute and/or indicator indicating that the user interface elements should be rendered by the two-dimensional renderer 318A), the three-dimensional renderer 318B passes the subtree and/or node to the two-dimensional renderer 318A for rendering. In one or more implementations, the three-dimensional renderer 318B may further pass context information pertaining to the rendering, and/or the two-dimensional renderer 318A and the three-dimensional renderer 318B may maintain separate contexts. The two-dimensional renderer 318A may render (and/or rasterize) the content and may provide the rendered content back to the three-dimensional renderer 318B.

The user interface manager 312 may receive the rendered two-dimensional content 316 that was rendered by the two-dimensional renderer 318A, and the supplemental three-dimensional content 320 that was rendered by the three-dimensional renderer 318B and may provide the rendered content 316, 320 to the compositor 322. In the instance that the rendered content 316, 320 is being displayed in a system that utilizes a pass-through video stream 324 (e.g., from an image sensor and/or camera), the compositor 322 may composite the rendered content 316, 320 with the pass-through video stream 324 and may provide the composited output for display by the display device 208. In one or more implementations, the pass-through video stream 324 may not be utilized, and the rendered content 316, 320 may be passed to the compositor for providing to the display device 208 (e.g., without the pass-through video stream 324), and/or the rendered content 316, 320 may be provided directly to the display device 208 bypassing the compositor 322.

In one or more implementations, the user interface manager 312 may further receive three-dimensional content 308 from the first application 302 for rendering by the three-dimensional renderer 318B. The user interface manager 312 may provide the three-dimensional content 308 to the three-dimensional renderer 318B for rendering and may then provide the rendered three-dimensional content 314 with the rendered two-dimensional content 316 and the enhanced supplemental three-dimensional content 320 to the compositor 322. Thus, content from both applications 302-304 may be concurrently displayed on the display 208 of the electronic device 102.

In one or more implementations, the user interface manager 312 may provide the compositor 322 with position information indicating where the content 316, 320 should be composited onto the pass-through video stream 324. In one or more implementations, the user interface manager 312 may provide the compositor 322 with instructions for modifying, filtering, or otherwise adjusting the pass-through video stream 324, and/or the composited output. For example, when a backdrop is being utilized, the user interface manager 312 may provide the compositor 322 with an indication of a portion (or all) of the pass-through video stream that should be blurred (e.g., with or without a stereo effect). Alternatively, and/or in addition, the user interface manager 312 may provide instructions for foveating the composited output (such as based on a center of view of the user) and/or the user interface manager 312 may foveate the rendered content 316, 320 and/or may provide the rendered content in accordance with a constant compute time. In one or more implementations, all or a portion of the pass-through video stream 324 may be provided to the user interface manager such that the user interface manager 312 (and/or one or more of the renderers 318A-B) can apply one or more visual effects (e.g., a three-dimensional blur), can apply foveation, and/or can otherwise adjust or modify the pass-through video stream 324 that is composited.

In one or more implementations, the user interface manager 312 may provide for translating from two dimensions to three dimensions. For example, the two-dimensional content 310 as provided by the second application 304 may be applied to a three-dimensional geometry. In another example, the user interface manager 312 may provide for a three-dimensional windowing model, such that the two-dimensional content 316 may be bounded by window(s) in the three-dimensional environment (e.g., where the window(s) may have horizontal, vertical, depth, bounding volume properties and/or properties for defining a plane or part thereof).

In another example, the user interface manager 312 may be configured to adjust one or more of a frame rate and/or resolution associated with the two-dimensional content 316. For example, for virtual reality (e.g., in which virtual content recreates/replaces a real life setting), real-time image capture of the surrounding environment may not be required for display. Thus, the frame rate and/or resolution may be decreased relative to frame rate of the two-dimensional content 316 provided by the second application 304.

In one or more implementations, the lower frame rate may be applicable to virtual/mixed reality when an additive display is used, since compositing of a corresponding video stream may not be required. In addition, the lower frame rate images may be used in conjunction with positional tracking (e.g., where the images are used to determine device location, and may not be displayed).

In one or more implementations, the application (e.g., the second application 304) may be configured to account for image frame(s) that are not available. For example, the unavailable image frame(s) may be at least partially attributable to the above-mentioned lower frame rate. In one or more implementations, the application may account for (and remain operable with respect to) image frame(s) that are not available, for example, by implementing a computer vision (CV) algorithm that uses a camera feed of the electronic device 102.

In one or more implementations, the user interface manager 312 and/or the compositor 322 may perform compositing and/or lens correction (e.g., for converting from monoscopic to stereoscopic video) with respect to the two-dimensional content 316, where the compositing and/or lens correction corresponds to specifications of the display device 208 and/or specifications of a separate display device of the second device. The user interface manager 312 and/or the compositor 322 may provide for receiving updated configuration settings of the display hardware of the display device (e.g., the display device 208 and/or the separate display device of the second device), for example, to update lens settings (e.g., warp) for the particular display device.

In one or more implementations, the two-dimensional content 316 provided by the second application 304 may correspond to a monoscopic video format, and the user interface manager 312 may be configured to convert the monoscopic video to stereoscopic video. In one or more implementations, the architecture 300 (e.g., including the user interface manager 312) may provide for reprojection (e.g., with respect to monoscopic vs. stereoscopic video formats), in addition to lens correction and/or compositing. As such, the application (e.g., the second application 304) may not be required to account for monoscopic and/or stereoscopic video formats.

In one or more implementations, the architecture 300 (e.g., including the user interface manager 312) may provide for abstracting away rendering with respect to the application (e.g., the second application 304). For example, regarding alpha compositing (e.g., in which an image may be combined with a background to create the appearance of partial or full transparency), the application 304 may provide for the alpha whether or not the alpha is needed. In an additive type of display, the user interface manager 312 may not use the alpha. However, for an opaque type of display, the alpha may be used for compositing with a video feed.

Further, the application (e.g., the second application 304) itself may not place window(s) on the screen (e.g., of the display device 208). Since the application may not be required to account for window placement and sizing, the architecture 300 may be configured to host developer content (e.g., the two-dimensional content 316) in a virtual/mixed reality environment that is not confined to two dimensions (e.g., to a two-dimensional screen).

In one or more implementations, the architecture 300 (e.g., including the user interface manager 312) may provide for central simulation and rendering of content (e.g., two-dimensional and/or three-dimensional content as provided by the applications 302-304), for example, in a three-dimensional environment. In addition, the user interface manager 312 may provide for simulating content with respect to a particular scene in a three-dimensional environment.

In one or more implementations, the user interface manager 312 may provide for throttling an application when the content provided by the application (e.g., the rendered content 314, 316 and/or 320) is out of view on the display device 208. Depending on the visibility of the application content, the user interface manager 312 may perform less processing with respect to the application. For example, certain application tasks/events (e.g., associated with rendering content) may not be performed and/or may otherwise be de-prioritized by the user interface manager 312 when application content is not visible.

In one or more implementations, the user interface manager 312 may provide for event handling which associates (e.g., maps) three-dimensional input to corresponding two-dimensional input (e.g., associated the two-dimensional content 316). The user interface manager 312 may provide for mapping a library of three-dimensional input gestures to a library of two-dimensional input gestures for event handling. For example, a touch event corresponding to a touching a plane corresponding to application content in the three-dimensional environment may be mapped to a touch event on a screen (e.g., glass) of the electronic device 102. In another example, the user interface manager 312 may be configured to map user input associated with a user gaze (e.g., indicating a portion of the display that the user is focusing on with his/her eyes) to corresponding input event with for two-dimensional content (e.g., such that the application receives the identified portion and may be configured to perform operations with respect to that portion). In this manner, while the application (e.g., the second application 304) may not be aware of and/or configured to account for three-dimensional input events, the application may still function as expected based on the corresponding mapped two-dimensional input events.

In one or more implementations, one or more of components of the first application 302, the second application 304, the renderers 318A-B, and/or the user interface manager 312 are implemented as software instructions, stored in the memory 204, which when executed by the processor 202, cause the processor 202 to perform particular function(s).

In one or more implementations, one or more of components of the first application 302, the second application 304, the user interface manager 312, and/or the renderers 318A-B may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
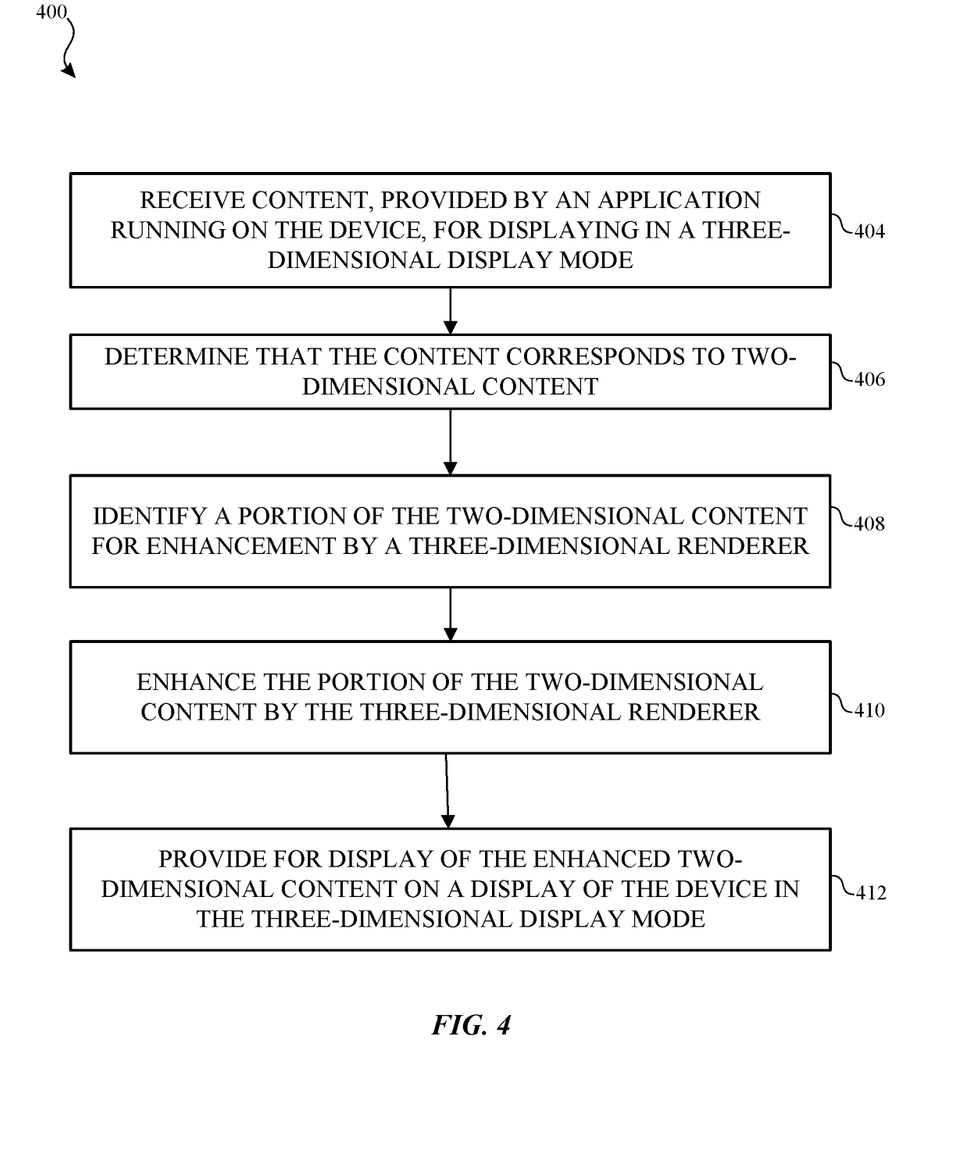
FIG. 4 illustrates a flow diagram of an example process for multi-modal rendering of application content in accordance with one or more implementations.

FIG. 4 illustrates a flow diagram of an example process for providing display of application content in accordance with one or more implementations. For explanatory purposes, the process 400 is primarily described herein with reference to the electronic device 102 of FIG. 1. However, the process 400 is not limited to the electronic device 102 of FIG. 1, and one or more blocks (or operations) of the process 400 may be performed by one or more other components and other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or may be replaced by other operations.

The process 400 may begin when the user interface manager 312 running on the electronic device 102 receives content provided by an application running on the electronic device 102, such as the second application 304, for displaying in the three-dimensional display mode, such as a CGR or virtual reality display mode (404). In one or more implementations, the application content may be declaratively defined, such as via a tree or graph, and/or the application may have been developed and/or compiled for display of the content in a two-dimensional display mode.

The user interface manager 312 (and/or one of the renderers 318A-B), may parse the received content (such as parsing a tree representing the received content) and may determine that at least a portion of the content corresponds to two-dimensional content (406). For example, the user interface manager 312 may determine, e.g. based on at least a portion of the tree, that the content was developed for display in a two-dimensional display mode.

The user interface manager 312 (and/or one of the renderers 318A-B) may identify a portion of the two-dimensional content that can be enhanced by the three-dimensional renderer 318B for display in the three-dimensional display mode (408). For example, the user interface manager 312 may identify one or more two dimensional user interface elements described in the received content that can be mapped to a counterpart three-dimensional user interface element, such as via a three-dimensional library of user interface elements.

The portion of the content (e.g., a node and/or subtree) may be provided to the three-dimensional renderer 318B which may render the content in the three-dimensional form (410). The user interface manager 312 may then provide the rendered enhanced portion of the two-dimensional content for display on a display device 208 of the electronic device 102 in the three-dimensional mode (412). In one or more implementations, another portion of the content may be provided to the two-dimensional renderer 318A for rendering, and the rendered two-dimensional content may be provided for display in conjunction with the rendered enhanced portion of the two-dimensional content.

As described above, one aspect of the present technology is the gathering and use of data available from specific and legitimate sources for managing multi-modal rendering of application content. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for managing multi-modal rendering of application content. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing multi-modal rendering of application content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 5:
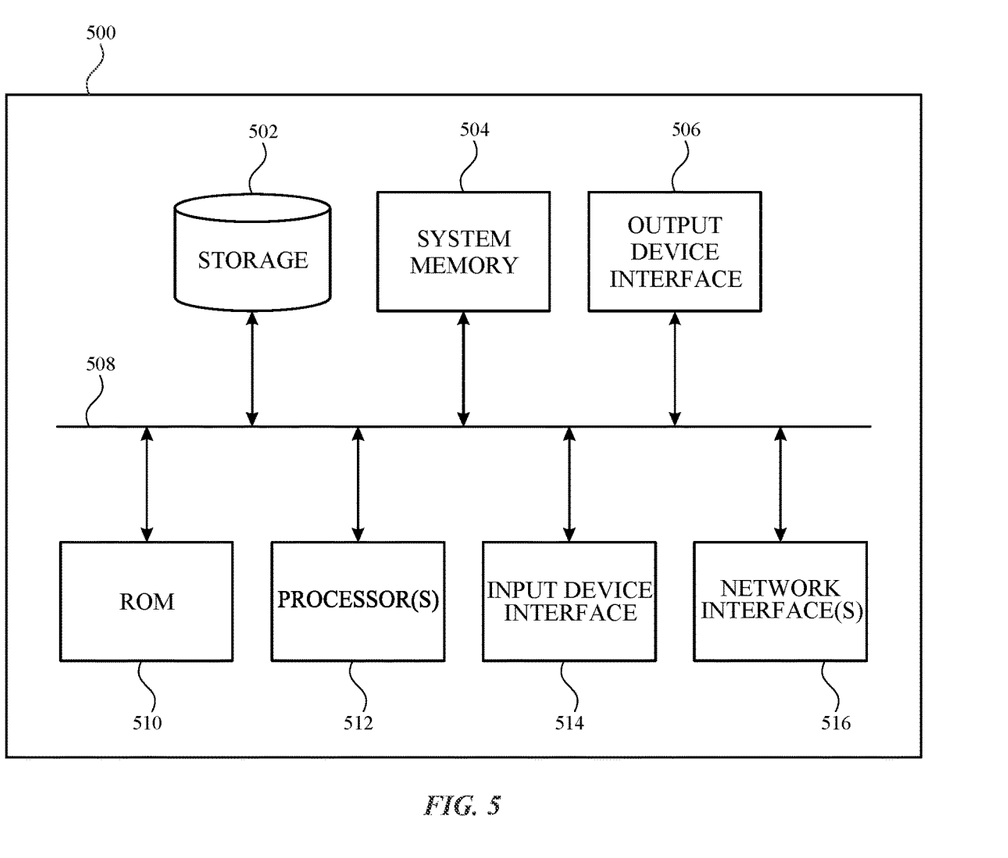
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-104 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the server 108 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a device, while in other implementations, the tangible computer-readable storage medium can be indirectly coupled to a device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on a device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving content, provided by an application running on a device, for displaying in a three-dimensional display mode;
    determining that the content corresponds to two-dimensional content;
    identifying a portion of the two-dimensional content for enhancement by a three-dimensional render, the identified portion comprising text content;
    enhancing, in response to the determining, the portion of the two-dimensional content by the three-dimensional renderer, wherein the enhancing comprises:
        serializing the text content into a format for processing by a graphics processing unit,
        passing the serialized text content to the graphics processing unit, and
        receiving, from the graphics processing unit, a vector graphics based version of the text content; and
    providing for display of the rendered enhanced portion of the two-dimensional content on a display of the device in the three-dimensional display mode.

2. The method of claim 1, wherein enhancing the identified portion of the two-dimensional content further comprises rendering the enhanced identified portion of the two-dimensional content and the method further comprising:
    rendering, by a two-dimensional renderer that is separate from the three-dimensional renderer, another portion of the two-dimensional content; and
    providing for display of the rendered enhanced portion of the two-dimensional content and the rendered other portion of the two-dimensional content on the display of the device in the three-dimensional display mode.

3. The method of claim 2, wherein providing for display of the enhanced portion of the two-dimensional content on the display of the device in the three-dimensional display mode further comprises:
compositing a pass-through video stream with the rendered enhanced portion of the two-dimensional content and the rendered other portion of the two-dimensional content.

4. The method of claim 1, wherein the application was compiled for display of content in a two-dimensional display mode.

5. The method of claim 1, wherein the content is declaratively defined.

6. The method of claim 5, wherein the content is declaratively defined based at least in part on a layer tree and identifying the portion of the two-dimensional content for enhancement by the three-dimensional render further comprises:
determining that a layer of the layer tree comprises a particular flag that identifies the layer for enhancement.

7. The method of claim 1, wherein the content for enhancement comprises a particular visual effect associated with one or more attributes, and enhancing, in response to the determining, the portion of the two-dimensional content by the three-dimensional renderer comprises rendering a three-dimensional version of the particular visual effect based on the one or more attributes.

8. The method of claim 7, wherein the particular visual effect comprises a blur effect, and the one or more attributes comprise at least one of a size or a depth of the blur effect.

9. The method of claim 1, wherein enhancing the two-dimensional content comprises transforming a predefined two-dimensional user interface element included in the two-dimensional content to a corresponding three-dimensional user interface element.

10. The method of claim 1, wherein enhancing the two-dimensional content comprises performing at least one of compositing or lens correction with respect to the two-dimensional content, based on specifications of the display.

11. The method of claim 1, wherein enhancing the portion of the two-dimensional content comprises converting the portion of the two-dimensional content from a monoscopic video format to a stereoscopic video format.

12. A device, comprising:
at least one processor; and
a memory including instructions that, when executed by the at least one processor, cause the at least one processor to:
receive content, provided by an application running on a device, for displaying in a three-dimensional display mode, the application having been compiled for display of content in a two-dimensional display mode;
determine that the content corresponds to two-dimensional content;
identify a portion of the two-dimensional content for enhancement by a three-dimensional render;
enhance, in response to the determining, the portion of the two-dimensional content by the three-dimensional renderer;
render, by a two-dimensional renderer that is separate from the three-dimensional renderer, another portion of the two-dimensional content; and
provide for display of the rendered enhanced portion of the two-dimensional content and the rendered other portion of the two-dimensional content on a display of the device in the three-dimensional display mode.

13. The device of claim 12, wherein the application was compiled for display of content in a two-dimensional display mode.

14. The device of claim 12, wherein the content is declaratively defined.

15. The device of claim 14, wherein the content is declaratively defined based at least in part on a layer tree and identifying the portion of the two-dimensional content for enhancement by the three-dimensional render further comprises:
determining that a layer of the layer tree comprises a particular flag that identifies the layer for enhancement.

16. A computer program product comprising code, stored in a non-transitory computer-readable storage medium, the code comprising:
code to receive content, provided by an application running on a device, for displaying in a three-dimensional display mode, the application having been compiled for display of content in a two-dimensional display mode;
code to determine that the content corresponds to two-dimensional content;
code to identify a portion of the two-dimensional content for enhancement by a three-dimensional render;
code to enhance, in response to the determining, the portion of the two-dimensional content by the three-dimensional renderer;
code to composite a pass-through video stream with the rendered enhanced portion of the two-dimensional content; and
code to provide for display of the rendered enhanced portion of the two-dimensional content composited with the pass-through video stream on a display of the device in the three-dimensional display mode.

17. The computer program product of claim 16, wherein the identified portion of the two-dimensional content for enhancement comprises text content, and the code further comprises:
code to serialize the text content into a format for processing by a graphics processing unit;
code to pass the serialized text content to the graphics processing unit; and
code to receive, from the graphics processing unit, a vector graphics based version of the text content.

18. The computer program product of claim 17, wherein code to provide for display of the rendered enhanced portion of the two-dimensional content on the display of the device in the three-dimensional display mode comprises:
code to provide for display of the vector graphics based version of the text content in a manner that is perspective correct with respect to a user of the device.

19. The computer program product of claim 16, wherein the code further comprises:
code to render, by a two-dimensional renderer that is separate from the three-dimensional renderer, another portion of the two-dimensional content; and
code to provide for display of the rendered enhanced portion of the two-dimensional content and the rendered other portion of the two-dimensional content on the display of the device in the three-dimensional display mode.

20. The device of claim 19, wherein the at least one processor is further configured to:
composite a pass-through video stream with the rendered enhanced portion of the two-dimensional content and the rendered other portion of the two-dimensional content.

* * * * *